Sept. 27, 1949.  L. B. THWAITES  2,483,356
TRAILER-MOUNTED LIFTING APPARATUS
Filed Aug. 2, 1946  2 Sheets-Sheet 1
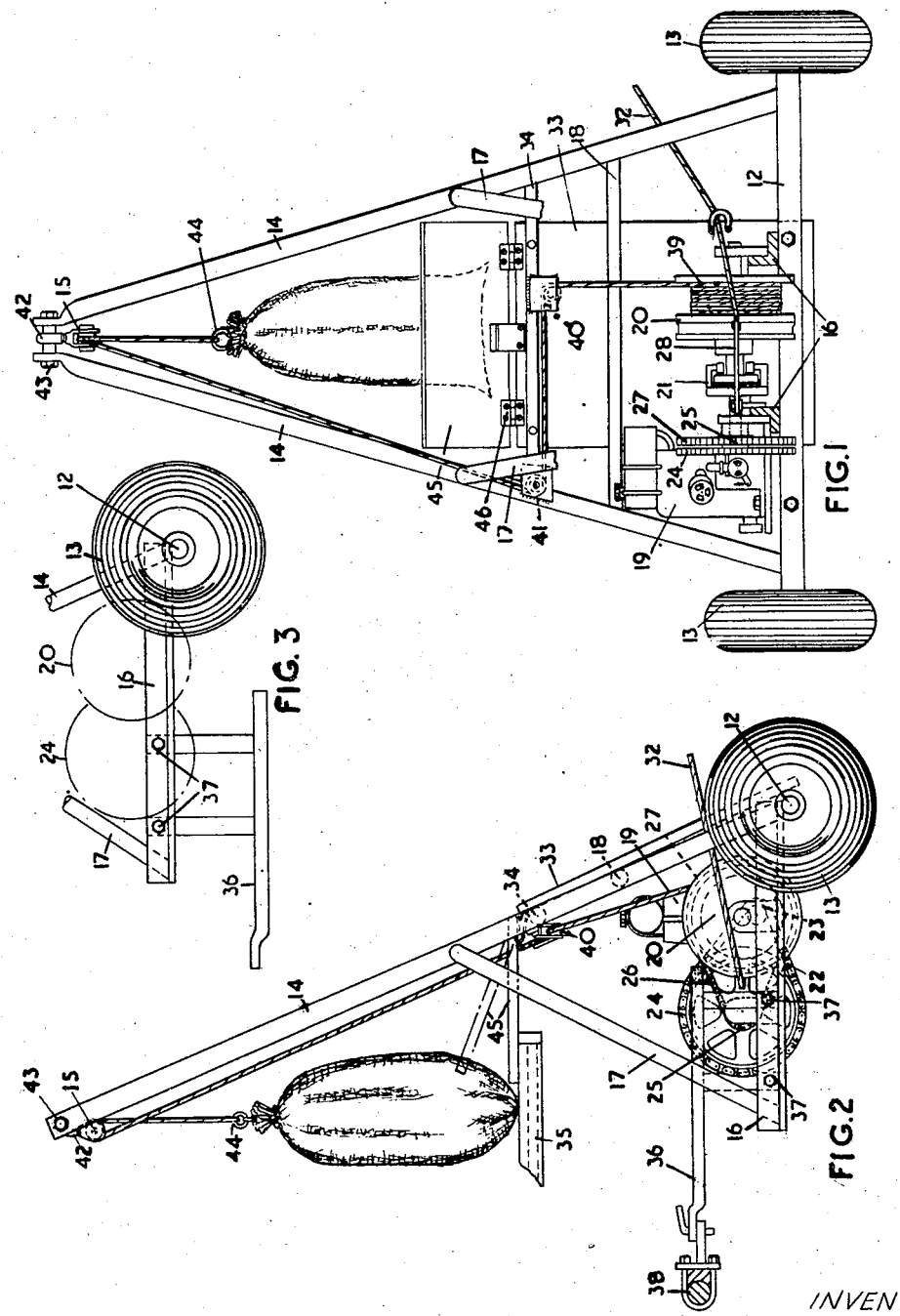
INVENTOR
LESLIE B. THWAITES
BY Mawhinney & Mawhinney
ATTORNEYS

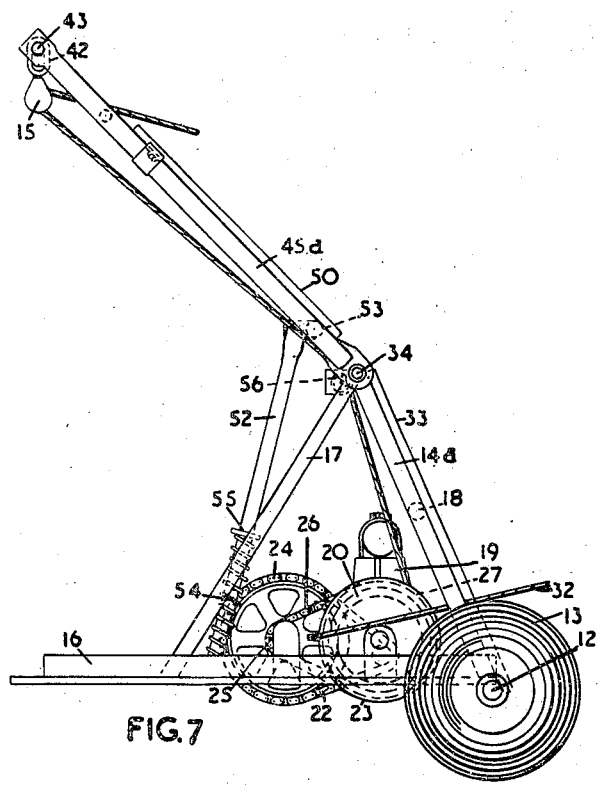
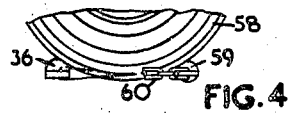
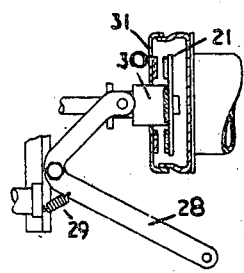
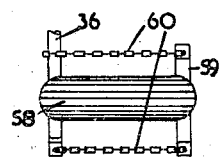

Patented Sept. 27, 1949

2,483,356

UNITED STATES PATENT OFFICE 2,483,356

TRAILER-MOUNTED LIFTING APPARATUS

Leslie Basil Thwaites, Cubbington, near Leamington Spa, England

Application August 2, 1946, Serial No. 688,114
In Great Britain March 6, 1946

2 Claims. (Cl. 214—100)

My main object is to provide an improved portable apparatus for transferring bales, bags or sacks of material, boards of bricks, buckets of cement, or the like (hereinafter referred to as compact loads), to a relatively raised platform, for example, of a builder's scaffold or of a wheeled carriage—the term platform being used herein in a generic sense to include the floor of a carriage or other relatively raised base. But in some conditions the apparatus of the invention can be advantageously used for hoisting a compact load when there is no such platform, in order that a person may conveniently take the load on his back and carry it elsewhere.

According to the invention, a lifting apparatus consists in part of a guide, for a compact load, to be mounted in an upwardly-extending position when in use, and a load suspension means situated above and to one side of the upper end of the guide when so mounted; the arrangement being such that, when in use, the load can first be drawn up along the other side of the guide, and after clearing the upper end of the guide can swing freely to a discharge position on said one side of the guide.

The apparatus of the invention also includes a frame adapted to be located or fixed so that a guide for the load extends substantially from the ground in a generally vertical direction, a pulley means supported to be well above the upper end of the guide and to be set back on the appropriate side of the upper end, and a controllable winding drum, adapted to be power driven, for a cable rope, chain or the like (hereinafter deemed to be included by the term cable) to be rove through the pulley means and attached to a compact load, the parts thereof being so arranged that the load can be drawn up the guide to swing clear of the upper end of the guide (when properly fixed) on operation of the winding drum, and then lowered as desired.

The apparatus is, as stated, particularly for use with a platform of a wheeled carriage (which may, of course, be a trailer) onto which compact loads are to be loaded, and the apparatus in that case preferably has a pair of coaxial road-wheels and a draw-bar adapted to be held by the carriage for the purpose of locating the apparatus relatively to the platform with the guide extending substantially from the ground to one edge of the platform in a generally vertical direction. Thus, whilst the carriage is in motion the apparatus can, if required, be used for transferring compact loads to the platform.

For preference the apparatus includes a motor, on the frame, for driving the winding drum through a clutch, and means whereby the clutch can be remotely controlled—for example, by a person standing by a compact load to which the cable is being attached.

I may also provide a flap hinged on the frame near the upper edge of the guide and spring biassed to a raised position in which it forms a continuation of the guide (though it need not be in the same plane). Such a flap can serve, when depressed against its spring to a substantially horizontal position into contact with an abutment, by the weight of a compact load thereon which has been raised just above the upper end of the guide, as a support for the load when the latter has been released from the cable. Such a flap is particularly advantageous in a case in which a person intends to carry off the load on his back, the abutment aforesaid then being provided by the frame.

In a development of this flap idea the pulley means is carried at the upper end of the flap, the cable being guided at the back of the flap by a pulley disposed adjacent the hinged axis of the flap.

In the accompanying drawings:

Figure 1 is a part-sectional elevation of an apparatus, according to the invention, taken from the rear, i. e., from a platform with which the apparatus is assumed to be associated, the view showing a compact load at the moment when it has been hoisted just above the upper end of the guide and is about to swing about the offset pulley means to knock down the pivoted flap (with which the apparatus is, in this instance, provided) on to the adjacent edge of the platform;

Figure 2 is a side elevation of the apparatus of Figure 1 attached to a wheeled carriage, only a small part of which latter is shown, the flap being indicated by chain lines in the position it occupied before depressed by the weight of the compact load upon it:

Figure 3 is a fragmentary side elevation corresponding to that of Figure 2 but with the tow bar of the apparatus shown in another position in which it can alternatively be placed for the purpose of locating the apparatus relatively to the wheeled carriage;

Figure 4 is a fragmentary view of the tow bar when in this alternative position and engaged by one of the wheels of the carriage, and Figure 5 is a plan thereof to a smaller scale;

Figure 6 is an enlarged view indicating one way in which the clutch in the drive to the winding drum may be actuated; and Figure 7 is a side elevation corresponding to that of Figure 2, but showing an alternative arrangement according to the invention.

Like reference characters are used throughout the various figures to indicate corresponding parts.

In the example of Figures 1 to 6 the frame of the apparatus includes a through axle 12 with ground engaging wheels 13 at its ends, main upright members 14 which are triangular with the axle in front elevation and which support pulley means 15 at their upper ends, L-sectioned chassis members 16 the forward ends of which are supported upon the axle, two inclined stays 17 at the rear extending from the uprights 14 to the rear ends of the chassis members 16, and a transverse member 18 between the two uprights. The base portion of the frame in this case is shown as supporting an internal-combustion engine, indicated at 19, by which a winding drum 20 can be driven through a clutch 21.

As shown, the drive from the engine to the driving shaft of the clutch may be by way of a chain 22 from a small engine sprocket 23 to a large sprocket 24, the latter being fast with a small sprocket 25 driving by a chain 26 to a large sprocket 27 fast with the driving shaft of the clutch, thus giving a suitable speed reduction.

In the present instance the clutch 21, as shown most clearly by Figure 6, may include an actuating lever 28 biassed by a spring 29 to a position in which the slidable driving element 30 of the clutch is engaged with the driven element 31 thereof, the latter being fast with the winding drum 21. The other end of the actuating lever 28 is connected by a control wire 32 which when pulled will engage the clutch against the opening pressure of the spring 29.

The guide aforesaid is in this example a stationary one 33 extending between the axle 12 and a cross member 34. When the apparatus is located with respect to a platform 35 (Figure 2) of a wheeled carriage, the guide is inclined at a relatively small angle, of about 20°, to the vertical, and the guide is of such length as to extend substantially from the ground up to the level of the platform.

In Figure 2 the apparatus is shown as being thus located by means of a draw-bar 36 detachably secured to the chassis longitudinals 16 by means of bolts 37, the draw-bar being detachably connected in any convenient manner to the adjacent axle 38 of the wheeled carriage.

The free length of the winding cable, which is shown at 39 (Figure 1) as wound on the drum, the inner end of the cable being fast with the drum, passes over a pulley 40 and then laterally to a pulley 41 mounted on the back of one of the uprights 14, thereafter being rove through the pulley means 15. This latter is swivelled on a loop 42 which is in turn movable in other directions upon the cross-pin 43 joining the upper ends of the uprights 14 together.

Thus, when the apparatus is properly located or fixed, a worker can take the loose end of the clutch control wire 32 in one hand and the loose end 44 of the winding cable in the other hand, and can walk to a compact load. After connecting the loose end 44 of the cable to the load he can pull the clutch control wire 32 to effect engagement of the clutch, whereupon the winding cable will drag the load towards the guide. The worker can follow up the load, if desired, by maintaining the necessary tension on the clutch control wire 32. When the load reaches the guide it is drawn up the guide until it clears the upper edge thereof, as shown by Figure 1, whereupon it can swing inwardly (as the pulley means 15 is offset on the appropriate side of the upper edge of the guide), thus carrying the load over the platform. The worker thereupon releases the tension on the clutch wire 32, to effect release of the clutch, and the load is thus lowered. A trolley can be placed to receive it, or on being disconnected from the loose end 44 of the cable it can be man-handled to an appropriate position on the platform.

The worker whilst the clutch wire 32 is still released, can then seize the loose end 44 of the winding cable and pull it out to another compact load, during which the winding drum 20 is being unwound. The stage is then all set for the transfer on to the platform of another compact load.

At 45 I indicate a small flap which can be mounted at 46 for movement about a horizontal axis near the upper end of the guide 33, being spring biassed (for example, as shown by Figure 7) to a raised position such as that shown by the chain lines in Figure 2. The flap, it will be observed, forms a continuation of the guide, though it is inclined thereto.

The compact load, when swinging free of the upper edge of the guide depresses the flap by its weight to the horizontal position, shown in full lines in Figure 2, in which the flap rests on the end of the platform 35 and thus bridges the gap between the upper end of the guide and the platform. Actually, however, it is not necessary to provide a flap for this purpose; but by providing the frame with an abutment to restrict the downward movement of the flap the apparatus can be used independently of any platform 35 for hoisting a compact load on to the flap; and when a person is going to pick the load up on his back it is then at a convenient height, and he can take it up as soon as it has been detached from the loose end 44 of the winding cable.

In the modification of Figure 7 the frame comprises two short main uprights 14a which are interconnected with one another at their upper ends by the cross member 34, the upper ends being spaced from one another as shown by Figure 1 and connected to the inclined rear stays 17. The guide 33 extends up to the cross member and the latter provides a pivotal support for a larger flap 45a which is boarded over, as shown at 50. The flap 45a may be triangular in front elevation, like the upper part of the uprights 14 of Figure 1. The pulley means 15 is in this case supported in a pivotal manner from the centre of the pin 43 of the flap 45a. The latter is biassed to a raised position—for example, as shown in Figure 7, i. e., by means of a strut 52 pivoted to the flap at 53 and pressed upwardly by means of a coil compression spring 54 reacting between the base frame and an abutment 55 on the strut. An abutment (not shown) on the lower end of the strut engages the base frame to limit the upward movement.

In this arrangement the cable from the winding drum 20 passes through a pulley 56, disposed adjacent the hinged axis of the flap, to be rove through the pulley means 15.

Thus, in this example, when the loose end of the cable has been attached to a compact load and the clutch engaged by actuation of the clutch wire 32, the load is drawn to the lower end of the guide and then hoisted up the guide whilst the flap is maintained substantially in the position shown by Figure 7, by the spring 54. When, however, the load is shifted to the board 50 of the flap, i. e., is shifted clear of the upper end of the guide, the flap collapses under the weight of the load until a stop, not shown, restricts further downward movement of the strut 52, or, in the case of a relatively high platform, until the flap engages the upper surface of the platform; whereupon the worker releases the tension on the clutch wire 32 and the load can be removed from the flap and placed on the platform, where desired, and another compact load then dealt with in the same way. The stop may be constituted by the spring becoming solid.

Figure 2 shows a method of locating the apparatus in which the draw-bar 36 is attached to the axle 38 of the wheeled carriage. Thus, the apparatus can be towed after the carriage and can, in point of fact, be used for transferring compact loads on to the platform 35 whilst the carriage is in motion—assuming that the latter is not travelling at such a speed as to render this operation inconvenient. Naturally, the apparatus can also be used in this way when the carriage is stationary.

In case it is not convenient to attach the draw-bar 36 to an axle of a wheeled carriage in this way, it is possible with the apparatus shown to remove the bolts 37 and to detach the draw-bar 36 as a whole and re-secure it in an inverted position against the underside of the chassis members 16, as shown by Figure 3. The draw-bar can then be held down on the ground by an appropriate weight or other securing means.

In particular, as shown by Figures 4 and 5, the end of the draw-bar 36 may be passed beneath one of the wheels 58 of the wheeled carriage and a loose bar 59 passed on the other side of the wheel, the loose bar being connected as by chains 60 to the draw-bar, the wheel 58 thus locating the apparatus with respect to the carriage in a very simple manner.

In another alternative arrangement the guide 33, instead of being stationary as disclosed in Figure 7, may be fast with the flap 45a, the whole pivoting about the cross member 34 against the pressure of the spring 54 when a compact load passes from the guide to the board 50.

What I claim as my invention and desire to secure by Letters Patent of the United States is:

1. A lifting apparatus including a frame providing a guide for a load to be raised, said guide arranged to extend upwardly when the apparatus is in the operative position for raising the load, a single pair of coaxial road wheels, a draw bar by which the apparatus can be held in the operative position while being towed, a hinged flap lightly spring pressed to a position in which it forms a continuation of the guide, a pulley means supported to be above the upper end of the guide and to be set back on the appropriate side of the upper end when the apparatus is in the operative position, a winding drum for a cable to be rove through said pulley means and attached to the load on the side of said guide remote from that to which said pulley means is offset from the upper end of the guide, servo means for operating said winding drum, means for controlling the operation of said winding drum, and abutment means limiting the extent to which the flap can be depressed by the weight of the load thereon when hoisted above and swinging clear of the upper end of the guide.

2. A lifting apparatus, according to claim 1, characterised in that said pulley means is supported at the upper end of said flap, means being provided for guiding the cable at the back of the flap in the vicinity of the hinged axis of the flap.

LESLIE BASIL THWAITES.

REFERENCES CITED

The following references are of record in the file of this patent:

UNITED STATES PATENTS

| Number | Name | Date |
| --- | --- | --- |
| 1,011,266 | Sundh | Dec. 12, 1911 |
| 1,215,108 | Caley | Feb. 6, 1917 |
| 1,370,417 | Davis | Mar. 1, 1921 |
| 1,978,226 | Rear | Oct. 23, 1934 |

FOREIGN PATENTS

| Number | Country | Date |
| --- | --- | --- |
| 22,483 | Australia | May 2, 1935 |